(12) United States Patent
Morita et al.

(10) Patent No.: US 8,263,723 B2
(45) Date of Patent: Sep. 11, 2012

(54) ORGANOPOLYSILOXANE, METHOD OF MANUFACTURING THEREOF, CURABLE SILICONE COMPOSITION, AND CURED PRODUCT THEREOF

(75) Inventors: Yoshitsugu Morita, Ichihara (JP); Michitaka Suto, Midland, MI (US)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 12/935,092

(22) PCT Filed: Mar. 11, 2009

(86) PCT No.: PCT/JP2009/055362
§ 371 (c)(1),
(2), (4) Date: Dec. 10, 2010

(87) PCT Pub. No.: WO2009/122918
PCT Pub. Date: Oct. 8, 2009

(65) Prior Publication Data
US 2011/0086989 A1 Apr. 14, 2011

(30) Foreign Application Priority Data

Mar. 31, 2008 (JP) .................................. 2008-091550

(51) Int. Cl.
*C08G 77/04* (2006.01)
*C08G 77/06* (2006.01)
*C08G 77/12* (2006.01)
*C08G 77/20* (2006.01)
*C08G 77/38* (2006.01)

(52) U.S. Cl. ................ 528/10; 528/30; 528/31; 528/32; 528/33

(58) Field of Classification Search .................... None
See application file for complete search history.

(56) References Cited

U.S. PATENT DOCUMENTS

| | | | | |
|---|---|---|---|---|
| 3,269,983 A | * | 8/1966 | Holbrook | 528/15 |
| 3,361,714 A | * | 1/1968 | Omietanski | 528/33 |
| 4,374,967 A | * | 2/1983 | Brown et al. | 528/15 |
| 4,418,157 A | * | 11/1983 | Modic | 521/82 |
| 4,709,001 A | * | 11/1987 | Maxson | 528/15 |
| 4,711,928 A | * | 12/1987 | Lee et al. | 524/860 |
| 4,886,865 A | * | 12/1989 | Ikeno et al. | 528/15 |
| 4,983,701 A | * | 1/1991 | Hara et al. | 528/15 |
| 5,013,772 A | * | 5/1991 | Fujiki et al. | 523/213 |
| 5,087,720 A | * | 2/1992 | Kishita et al. | 556/434 |
| 5,281,656 A | * | 1/1994 | Thayer et al. | 524/601 |
| 5,446,087 A | * | 8/1995 | Chizat et al. | 524/588 |
| 5,504,175 A | * | 4/1996 | Kobayashi | 528/15 |
| 5,527,935 A | * | 6/1996 | Stepp et al. | 556/445 |
| 5,679,734 A | * | 10/1997 | Peccoux et al. | 524/267 |
| 6,458,461 B1 | * | 10/2002 | Blair et al. | 428/447 |
| 6,660,281 B1 | * | 12/2003 | Nakanishi et al. | 424/401 |
| 2005/0129957 A1 | * | 6/2005 | Kashiwagi et al. | 428/413 |
| 2007/0071980 A1 | * | 3/2007 | Kamei et al. | 428/405 |

FOREIGN PATENT DOCUMENTS

| | | |
|---|---|---|
| EP | 1767580 A1 | 3/2007 |
| JP | 11-001619 A | 1/1999 |
| JP | 2002-265787 A | 9/2002 |
| JP | 2004-186168 A | 7/2004 |
| WO | WO 2007-148812 A1 | 12/2007 |

OTHER PUBLICATIONS

English language translation and abstract for JP 11-001619 extracted from PAJ database Mar. 28, 2011 dated, 26 pages.
English language translation and abstract for JP 2002-265787 extracted from PAJ database Mar. 28, 2011 dated, 31 pages.
English language translation and abstract for JP 2004-186168 extracted from PAJ database Mar. 28, 2011 dated, 29 pages.
PCT International Search Report for PCT/JP2009/055362 dated Jun. 4, 2009, 3 pages.

* cited by examiner

*Primary Examiner* — Robert S Loewe
(74) *Attorney, Agent, or Firm* — Howard & Howard Attorneys PLLC

(57) ABSTRACT

A curable organopolysiloxane composition comprising: (A) an novel organopolysiloxane represented by the following average structural formula: $R^1_a SiO_{(4-a)/2}$ {wherein $R^1$ represents a substituted or non-substituted monovalent hydrocarbon group, an alkoxy group, a hydroxyl group, or an organopolysiloxane residue of the following general formula: —X—$(SiR_2O)_m SiR^2_3$ (wherein $R^2$ are the same or different, substituted or unsubstituted monovalent hydrocarbon groups; X represents oxygen atoms or a bivalent hydrocarbon group; and 'm' is an integer equal to or greater than 1); however, at least one $R^1$ in one molecule is the aforementioned organopolysiloxane residue, at least one $R^1$ is a monovalent hydrocarbon group having aliphatic carbon-carbon double bonds, and 'a' is a positive number that satisfies the following condition: $0<a<2$)}; (B) an organic silicon compound having in one molecule at least two silicon-bonded hydrogen atoms; and (C) a hydrosilylation catalyst; is capable of forming a cured product of high flexibility.

15 Claims, No Drawings

ORGANOPOLYSILOXANE, METHOD OF MANUFACTURING THEREOF, CURABLE SILICONE COMPOSITION, AND CURED PRODUCT THEREOF

RELATED APPLICATIONS

This application claims priority to and all the advantages of International Patent Application No. PCT/JP2009/055362, filed on Mar. 11, 2009, which claims priority to Japanese Patent Application No. JP 2008-091550, filed on Mar. 31, 2008.

TECHNICAL FIELD

The present invention relates to an organopolysiloxane, to a method of manufacturing thereof, to a curable silicone composition having the aforementioned organopolysiloxane as the main component, and to a cured product obtained from the aforementioned composition.

BACKGROUND ART

It was proposed to use curable silicone compositions that form heat-resistant and light-proof cured products as coating or sealing agents (see Japanese Unexamined Patent Application Publications (hereinafter referred to as "Kokai") Hei 11-1619, 2002-265787, and 2004-186168). However, although such curable silicone compositions demonstrate better resistance to heat and ultraviolet radiation than epoxy resins, they are inferior to epoxy resins in flexibility. Therefore, the use of these curable silicone compositions is associated with some problems such as damage of sealed elements and impaired adhesion to substrates.

On the other hand, known in the art are curable silicone rubber compositions that possess flexibility. However, these compositions have low strength and an insufficient modulus of elasticity.

Based on the results of a profound study conducted by the inventors herein, it was found that a curable silicone composition having a main component in the form of an organopolysiloxane with a previously introduced diorganopolysiloxane residue having a three-dimensional structure is capable of forming cured products of high hardness and improved resistance to cracking.

It is an object of the invention to solve the problems of the prior art by providing a novel organopolysiloxane, a method of manufacturing thereof, a curable silicone composition having the aforementioned organopolysiloxane as the main component and capable of forming a cured product of high flexibility, and a cured product obtained from the aforementioned composition.

DISCLOSURE OF INVENTION

The organopolysiloxane of the present invention is represented by the following average structural formula:

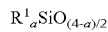

{wherein $R^1$ designates a substituted or non-substituted monovalent hydrocarbon group, an alkoxy group, a hydroxyl group, or an organopolysiloxane residue of the following general formula:

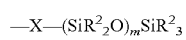

(wherein $R^2$ are the same or different, substituted or unsubstituted monovalent hydrocarbon groups; X represents oxygen atoms or a bivalent hydrocarbon group; and "m" is an integer equal to or greater than 1); however, at least one $R^1$ in one molecule is the aforementioned organopolysiloxane residue, and "a" is a positive number that satisfies the following condition: 0<a<2)}.

It is recommended that in the aforementioned organopolysiloxane at least one $R^1$ in one molecule be a monovalent hydrocarbon group having an aliphatic carbon-carbon double bond. It is recommended that in the organopolysiloxane at least one $R^1$ in one molecule be an aryl group. It is also recommended that in the organopolysiloxane at least one $R^2$ in one molecule be a methyl group. At 25° C., the organopolysiloxane is a solid substance or a liquid having a viscosity equal to or greater than 10 mPa·s.

A method of the invention for manufacturing the aforementioned organopolysiloxane comprising the step of causing a reaction between (i) an organopolysiloxane represented by the following average structural formula:

(wherein $R^3$ represents a substituted or unsubstituted monovalent hydrocarbon group, an alkoxy group, or a hydroxyl group, and wherein in one molecule at least one $R^3$ is a monovalent hydrocarbon group having an aliphatic carbon-carbon double bond; and "a" being a positive number that satisfies the following condition: 0<a<2), and (ii) a diorganopolysiloxane represented by the following general formula:

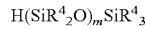

(wherein $R^4$ designates substituted or unsubstituted monovalent hydrocarbon groups that can be identical or different and that are free of unsaturated aliphatic bonds, and "m" is an integer equal to or greater than 1) {constituent (ii) is used in such an amount that the content of silicon-bonded hydrogen atoms of this constituent is less than 1 mole per 1 mole of the monovalent hydrocarbon groups having aliphatic carbon-carbon double bonds of the aforementioned constituent (i)}, the reaction being carried out in the presence of (iii) a hydrosilylation catalyst.

A curable silicone composition of the invention comprises:
(A) an organopolysiloxane that is represented by the following average structural formula:

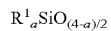

{wherein $R^1$ designates a substituted or non-substituted monovalent hydrocarbon group, an alkoxy group, a hydroxyl group, or an organopolysiloxane residue of the following general formula:

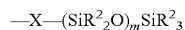

(wherein $R^2$ are the same or different, substituted or unsubstituted monovalent hydrocarbon groups; X represents oxygen atoms or a bivalent hydrocarbon group; and "m" is an integer equal to or greater than 1); however, at least one $R^1$ in one molecule is the aforementioned organopolysiloxane residue, at least one $R^1$ is a monovalent hydrocarbon group having aliphatic carbon-carbon double bonds, and "a" is a positive number that satisfies the following condition: 0<a<2)};

(B) an organic silicon compound having in one molecule at least two silicon-bonded hydrogen atoms {this component is used in such an amount that the content of silicon-bonded hydrogen atoms of this component ranges from 0.1 to 10 moles per 1 mole of the monovalent hydrocarbon groups having aliphatic carbon-carbon double bonds of the aforementioned component (A)}; and (C) a catalytic amount of a hydrosilylation catalyst.

Preferably, component (A) is an organopolysiloxane having in one molecule at least one $R^1$ as an aryl group. Component (A) should preferably have in one molecule at least one $R^2$ as a methyl group and, at 25° C., component (A) is a solid substance or a liquid having viscosity equal to or greater than 10 mPa·s.

A cured product of the invention is obtained by curing the aforementioned curable silicone composition.

Effects of Invention

The organopolysiloxane of the invention is a novel compound. The method of the invention allows efficient manufacturing of this compound. The curable silicone composition of the invention makes it possible to form a cured product that possesses a favorable modulus of elasticity, while the cured product of the invention is characterized by a favorable modulus of elasticity.

DETAILED DESCRIPTION OF THE INVENTION

The organopolysiloxane of the invention is represented by the following average structural formula:

$$R^1_a SiO_{(4-a)/2}$$

In this formula, $R^1$ designates a substituted or unsubstituted monovalent hydrocarbon group, an alkoxy group, a hydroxyl group, or an organopolysiloxane residue of the following general formula:

$$-X-(SiR^2_2O)_m SiR^2_3.$$

The substituted or unsubstituted monovalent hydrocarbon group designated by $R^1$ contains 1 to 12 carbon atoms, preferably 1 to 8 carbon atoms, and can be represented by the following specific examples: methyl, ethyl, propyl, isopropyl, butyl, isobutyl, tert-butyl, pentyl, neopentyl, hexyl, cyclohexyl, octyl, nonyl, decyl, or similar alkyl groups; vinyl, allyl, isopropenyl, butenyl, pentenyl, hexenyl, cyclohexenyl, octenyl, or similar alkenyl groups; a phenyl, tolyl, xylyl, naphthyl, or similar aryl groups; benzyl, phenethyl, phenylpropyl, or similar aralkyl groups; as well as the aforementioned groups having hydrogen atoms partially or completely substituted with fluorine, bromine, chlorine, or other halogen atoms, or cyano groups. Specific examples are the following: a chloromethyl, chloropropyl, bromoethyl, trifluoropropyl, or a similar halogen-substituted alkyl group or a cyanoethyl group. Preferable are alkyl, alkenyl, and aryl groups, especially methyl, vinyl, or phenyl groups. Alkoxy groups designated by $R^1$ can be exemplified by methoxy, ethoxy, and propoxy groups. Preferable are methoxy and ethoxy groups.

In the diorganopolysiloxane residue designated by $R^1$, the substituted or unsubstituted monovalent hydrocarbon groups designated by $R^2$ are the same or different and may be exemplified by the same groups as those exemplified above for $R^1$. In the formula, X represents oxygen atoms or a bivalent hydrocarbon group. The bivalent hydrocarbon groups can be exemplified by methylene, ethylene, propylene, butylenes, or similar alkylene groups; methylphenylene, ethylphenylene, or similar alkylarylene groups; ethylenoxyethylene, ethylenoxypropylene, or similar alkylenoxyalkylene groups. Most preferable are alkylene groups. In the formula, "m" is an integer equal to or greater than 1, preferably an integer in the range of 1 to 100, and more preferably, in the range of 4 to 80.

In the organopolysiloxane of the invention, at least one $R^1$ in one molecule is the aforementioned diorganopolysiloxane residue. It is recommended that at least one $R^1$ be a monovalent hydrocarbon group having an aliphatic carbon-carbon double bond. The monovalent hydrocarbon group having an aliphatic carbon-carbon double bond can be exemplified by an alkenyl group, preferably by a vinyl or allyl group. It is also recommended that in one molecule at least one group designated by $R^1$ comprise an aryl group, preferably a phenyl group. It is further recommended that in one molecule at least one group designated by $R^2$ comprise a methyl group.

In the above formula, "a" is a positive number that satisfies the following conditions: 0<a<2, preferably 1≦a<2, more preferably 1≦a≦1.8, and most preferably 1≦a≦1.5.

There are no special restrictions with regard to the molecular structure of the aforementioned organopolysiloxane, which may have a branched molecular structure or a structure having a three-dimensional network. There are no special restrictions with regard to the state of this organopolysiloxane at 25° C., and it may be a solid substance or a liquid substance with viscosity equal to or greater than 10 mPa·s.

A method for manufacturing the organopolysiloxane of the invention may comprise, e.g., the step of causing a reaction between (i) an organopolysiloxane represented by the following average structural formula:

$$R^1_a SiO_{(4-a)/2}$$

(wherein $R^3$ designates a substituted or unsubstituted monovalent hydrocarbon group, an alkoxy group, or a hydroxyl group, and wherein in one molecule at least one $R^3$ is a monovalent hydrocarbon group having an aliphatic carbon-carbon double bond; and "a" is a positive number that satisfies the following condition: 0<a<2), and (ii) a diorganopolysiloxane represented by the following general formula:

$$H(SiR^4_2O)_m SiR^4_3$$

(wherein $R^4$ designates substituted or unsubstituted monovalent hydrocarbon groups that can be identical or different and that are free of unsaturated aliphatic bonds, and "m" is an integer equal to or greater than 1) {constituent (ii) is used in such an amount that the content of silicon-bonded hydrogen atoms of this constituent is less than 1 mole per 1 mole of the monovalent hydrocarbon groups having aliphatic carbon-carbon double bonds of constituent (i)}, the reaction being carried out in the presence of (iii) a hydrosilylation catalyst.

Thus, constituent (i) is an organopolysiloxane represented by the following average structural formula:

$$R^1_a SiO_{(4-a)/2}$$

In the above formula, $R^3$ represents a substituted or unsubstituted monovalent hydrocarbon group, which can be exemplified by the same groups that have been given above as examples for $R^1$. Alkoxy groups designated by $R^3$ are the same alkoxy groups that have been given above as examples for $R^1$. In one molecule, at least one $R^3$ is a monovalent hydrocarbon group that has aliphatic carbon-carbon double bonds. Preferably, at least two $R^3$ are monovalent hydrocarbon groups having aliphatic carbon-carbon double bonds. Specific examples of these groups are the following: vinyl, allyl, isopropenyl, butenyl, pentenyl, hexenyl, cyclohexenyl, cycloheptenyl, or similar alkenyl groups. Preferable are vinyl and allyl groups. In the formula, "a" is a positive number that satisfies the following condition: $0<a<2$, preferably $1a<2$, more preferably $1\leqq a\leqq1.8$, and most preferably $1\leqq a\leqq1.5$.

Constituent (ii) is a diorganopolysiloxane represented by the following general formula:

$$H(SiR^4_2O)_m SiR^4_3.$$

In this formula, $R^4$ designates substituted or unsubstituted monovalent hydrocarbon groups that can be identical or different and that are free of unsaturated aliphatic bonds. The monovalent hydrocarbon group designated by $R^4$ may be exemplified by the same groups that have been given above as examples for the substituted or unsubstituted monovalent hydrocarbon groups designated by $R^1$, which are free of unsaturated aliphatic bonds. In one molecule, at least one group designated by $R^4$ is a methyl group. In this formula, "m" is an integer equal to or greater than 1, which preferably is in the range of 1 to 100, and more preferably in the range of 4 to 80.

In the manufacturing method of the invention, constituent (ii) is added in such an amount that the content of silicon-bonded hydrogen atoms of this constituent is less than 1 mole, preferably in the range of 0.05 to 0.95 moles, more preferably in the range of 0.1 to 0.95 mole, and most preferably in the range of 0.2 to 0.8 moles per 1 mole of the monovalent hydrocarbon groups having aliphatic carbon-carbon double bonds of constituent (i).

The hydrosilylation catalyst of constituent (iii) is used for accelerating the hydrosilylation reaction between constituents (i) and (ii). Constituent (iii) is represented by platinum-type catalysts, rhodium-type catalysts, or palladium-type catalysts. The platinum-type catalyst provides most significant acceleration of the hydrosilylation reaction. The platinum-type catalyst can be represented by a finely powdered platinum, chloroplatinic acid, an alcohol solution of a chloroplatinic acid, a platinum-alkenylsiloxane complex, platinum-olefin complex, or a platinum-carbonyl complex. The most preferable is the platinum-alkenylsiloxane complex, which can be exemplified by 1,3-divinyl-1,1,3,3-tetramethyl disiloxane, 1,3,5,7-tetramethyl-1,3,5,7-tetravinylcyclotetrasiloxane, the aforementioned alkenylsiloxanes having a part of their methyl groups substituted with ethyl, phenyl, or similar groups, or the aforementioned alkenylsiloxane having their vinyl groups substituted with allyl, hexenyl, or similar groups.

There are no special restrictions with regard to amounts in which constituent (iii) can be added. It can be recommended, however, that, in terms of weight units, constituent (iii) be used in an amount of 0.01 to 1,000 ppm, and preferably 0.1 to 500 ppm of the catalytic metal contained in this component per total weight of constituents (i) and (ii).

There are no special restrictions with regard to conditions of the hydrosilylation reaction, and the reaction can be accelerated by heating. When the reaction system contains a solvent such as toluene, xylene, or a similar aromatic-type solvent, or heptane, hexane, or a similar aliphatic-type solvent, it is recommended that the reaction temperature be the reflux temperature of the solvent. If the system is free of an organic solvent, the reaction temperature may be equal to or below 200° C. By adding an organic solvent, it will be possible to reduce the viscosity of the reaction system and to dehydrate the reaction system by removing water due to azeotropy.

The organopolysiloxane obtained as described above can be dissolved in toluene, xylene, or a similar aromatic-type solvent; or in heptane, hexane, or a similar aliphatic-type solvent. There are no special restrictions with regard to the state of this component at 25° C., and it can be in the form of a liquid, viscous liquid, or solid substance. More specifically, the appearance of obtained component (A) will be different depending on difference in compatibility of constituents (i) and (ii) and their content ratio. Furthermore, if constituent (i) has a low molecular weight or is used in a reduced amount, component (A) will comprise a transparent or semi-transparent solid body. If constituent (i) is a macromolecule or is used in an increased amount, component (A) will become a semi-transparent gum or a gum with white turbidity. There are no special restrictions with regard to the molecular weight of component (A), but for better handleability and solubility in a solvent, it is recommended to have a polystyrene-referenced weight-average molecular weight determined by gel permeation chromatography in the range of 500 to 100,000, and preferably in the range of 1,000 to 50,000.

The following description concerns the curable silicone composition of the invention.

The curable silicone composition of the invention comprises:

(A) an organopolysiloxane that is represented by the following average structural formula:

$$R^1_a SiO_{(4-a)/2}$$

{wherein $R^1$ designates a substituted or non-substituted monovalent hydrocarbon group, an alkoxy group, a hydroxyl group, or an organopolysiloxane residue of the following general formula:

$$-X-(SiR^2_2O)_m SiR^2_3$$

(wherein $R^2$ are the same or different, substituted or unsubstituted monovalent hydrocarbon groups; X represents oxygen atoms or a bivalent hydrocarbon group; and "m" is an integer equal to or greater than 1); however, at least one $R^1$ in one molecule is the aforementioned organopolysiloxane residue, at least one $R^1$ is a monovalent hydrocarbon group having aliphatic carbon-carbon double bonds, and "a" is a positive number that satisfies the following condition: $0<a<2)$};

(B) an organic silicon compound having in one molecule at least two silicon-bonded hydrogen atoms {this component is used in such an amount that the content of silicon-bonded hydrogen atoms of this component ranges from 0.1 to 10 moles per 1 mole of the monovalent hydrocarbon groups having aliphatic carbon-carbon double bonds of the aforementioned component (A)}; and (C) a catalytic amount of a hydrosilylation catalyst.

The organopolysiloxane of component (A) is represented by the following average structural formula:

$$R^1_a SiO_{(4-a)/2}$$

In this formula, $R^1$ designates a substituted or non-substituted monovalent hydrocarbon group, an alkoxy group, a hydroxyl group, or an organopolysiloxane residue of the following general formula:

$$-X-(SiR^2_2O)_m SiR^2_3.$$

These groups can be exemplified by the same groups that have been given above. At least one $R^1$ in one molecule should be the aforementioned organopolysiloxane residue and at least one $R^1$ should be a monovalent hydrocarbon group having aliphatic carbon-carbon double bonds. Specific examples of the monovalent hydrocarbon group having aliphatic carbon-carbon double bonds are alkenyl groups, preferably vinyl and allyl groups. Furthermore, in one molecule at least one group designated by $R^1$ may be an aryl group, preferably phenyl group. Also, in one molecule, at least one group designated by $R^2$ may be a methyl group. In the formula, "a" is a number that satisfies the following condition: $0<a<2$.

There are no special limitations with regard to the state of the organopolysiloxane of composition (A) at 25° C., which may be a solid substance or a liquid substance with viscosity equal to or greater than 10 mPa·s.

The organic silicon compound of component (B) is a component that is used for cross-linking component (A). There are no special restrictions with regard to this component, provided that it contains in one molecule at least two silicon-bonded hydrogen atoms. Also, there are no special restrictions with regard to the viscosity of component (B). It is recommended, however, that viscosity at 25° C. be equal to or below 1,000 mPa·s, preferably in the range of 0.5 to 500 mPa·s, and more preferably, in the range of 0.9 to 100 mPa·s. There are no special restrictions with regard to the number of silicon atoms contained in one molecule of component (B) but preferably this number should be in the range of 2 to 200, more preferably, 3 to 100, and most preferably, 4 to 50. The molecular structure of component (B) also is not restricted, and this component may have a linear structure, a cyclic molecular structure, the above structures, which are partially branched, or a three-dimensionally networked molecular structure.

Component (B) can be exemplified by such compounds as bis(dimethylsilyl)benzene, or a similar diorganosilyl-containing non-siloxane-type compound, a siloxane-type compound that contains silicon-bonded hydrogen atoms, and preferably, a siloxane-type compound represented by the following average structural formula:

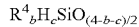

$$R^4{}_b H_c SiO_{(4-b-c)/2}$$

In this formula, $R^4$ designates monovalent hydrocarbon groups that are free of unsaturated aliphatic bonds. These groups can be exemplified by the same groups that have been given for this designation above. In the formula, "b" and "c" are positive numbers that satisfy the following conditions: $0.7 \leq b \leq 2.1$; $0.001 \leq c \leq 1.0$; and $0.8 \leq (b+c) \leq 2.6$, and preferably, the following conditions: $0.8 \leq b \leq 2$; $0.01 \leq c \leq 1$; and $1 \leq (b+c) \leq 2.4$.

Component (B) can be exemplified by the following compounds: 1,1,3,3-tetramethyldisiloxane, 1,3,5,7-tetramethyl-cyclotetrasiloxane, dimethylhydrogenpolysiloxane capped at both molecular terminals with trimethylsiloxy groups, a copolymer of a methylhydrogensiloxane and a dimethylsiloxane capped at both molecular terminals with trimethylsiloxy groups, dimethylpolysiloxane capped at both molecular terminals with dimethylhydrogensiloxy groups, a copolymer of a methylhydrogensiloxane and a dimethylsiloxane capped at both molecular terminals with dimethylhydrogensiloxy groups, a copolymer of a diphenylsiloxane and a methylhydrogensiloxy capped at both molecular terminals with trimethylsiloxy groups, a copolymer of a dimethylsiloxane, a diphenylsiloxane, and a methylhydrogensiloxane capped at both molecular terminals with trimethylsiloxy groups, a copolymer composed of $(CH_3)_2HSiO_{1/2}$ units and $SiO_{4/2}$ units, and a copolymer composed of $(CH_3)_2HSiO_{1/2}$ units, $SiO_{4/2}$ units, and $(C_6H_5)SiO_{3/2}$ units.

Component (B) is used in such an amount that the content of hydrogen atoms of this component should be in the range of 0.1 to 10 moles, preferably 0.1 to 5 moles, and, more preferably, 0.5 to 5 moles, most preferably, 0.8 to 2 moles, and even further preferably, 1.0 to 1.5 moles per 1 mole of monovalent hydrocarbon groups having aliphatic carbon-carbon double bonds of component (A). If component (B) is used in an amount less than the recommended lower limit, the composition will either not be cured to a sufficient degree, or the cured product of the composition will be subject to oxidation and yellowing at elevated temperatures because of the presence of residual unsaturated carbon-carbon double bonds. This will spoil the appearance of the product. If, on the other hand, the content of component (B) exceeds the recommended upper limit, this will make the cured product brittle.

The hydrosilylation catalyst of component (C) is used to accelerate cross-linking caused by the hydrosilylation reaction between the monovalent hydrocarbon groups of component (A) that contain aliphatic carbon-carbon double bonds and the silicon-bonded hydrogen atoms of component (B). The catalyst of component (C) is exemplified by the same examples that were given above with reference to constituent (iii).

There are no special restrictions with regard to the amounts in which component (C) can be added. It can be recommended, however, that in terms of weight units component (C) be added to the composition in an amount of 0.01 to 1,000 ppm, preferably 0.1 to 500 ppm of the catalytic metal contained in this constituent per total weight of components (A) and (B).

The composition of the invention may contain an optional component in the form of an organopolysiloxane such as aforementioned constituent (i) that contains in one molecule at least two alkenyl groups. There are no special restrictions with regard to the amounts in which this organopolysiloxane can be used. It may be, however, recommended to add this compound in the amount of 0.1 to 100 parts by weight for 100 parts by weight of component (A).

Other optional components of the composition that can be added for adjusting the speed of curing are exemplified by 2-methyl-3-butyn-2-ol, 3,5-dimethyl-1-hexyn-3-ol, phenyl-butynol, or a similar alkyne alcohol; 3-methyl-3-penten-1-yne, 3,5-dimethyl-3-hexen-1-yne, or a similar enyne compound; 1,3,5,7-teramethyl-1,3,5,7-tetravinyl cyclotetrasiloxane, 1,3,5,7-tetramethyl-1,3,5,7-tetrahexenyl cyclotetrasiloxane, and benzotriazole, or a similar reaction inhibitor. There are no special restrictions with regard to the amount in which such reaction inhibitors can be added, but in general, it is recommended that the added amount be in the range of 10 to 1,000 ppm in terms of weight of the composition.

For improving adhesive properties of the composition, the latter may contain an adhesion promoter. The adhesion promoter may comprise an organic silicon compound that contains in one molecule at least one silicon-bonded alkoxy group. Such alkoxy group may be represented by methoxy, ethoxy, propoxy, butoxy, and methoxyethoxy groups, with methoxy groups being particularly preferred.

Examples of silicon-bonded organic groups other than alkoxy groups contained in the organic silicon compound are the aforementioned alkyl groups, alkenyl groups, aryl groups, aralkyl, halogen-substituted alkyl groups, or other optionally substituted monovalent hydrocarbon groups; 3-glycidoxypropyl, 4-glycidoxybutyl, and other glycidoxyalkyl groups, 2-(3,4-epoxycyclohexyl)ethyl, 3-(3,4-epoxycyclohexyl)propyl, and other epoxycyclohexyl alkyl groups; 4-oxiranylbutyl, 8-oxiranyloctyl, and other oxiranylalkyl groups; or similar epoxy-containing monovalent organic groups; 3-methacryloxypropyl, or other acryl-containing monovalent organic groups. Other examples of suitable silicon-bonded groups include hydrogen atoms. Preferably, such organic silicon compounds contain groups reactive to components (A) or (B). e.g., alkenyl groups or silicon-bonded hydrogen atoms. From the viewpoint of improved adhesion to various substrates, it is recommended to use the organic silicon compounds that contain in one molecule at least one epoxy-containing organic group. The above-mentioned organic silicon compounds can be exemplified by organosilane compounds or organosiloxane oligomers. The organosiloxane oligomers may have a linear, partially-branched linear, branched, cyclic, or net-like molecular structure. Most preferable are linear, branched, or net-like molecular structures.

Such organic silicon compounds can be exemplified by 3-glycidoxypropyl trimethoxysilane, 2-(3,4-epoxycyclohexyl)ethyltrimethoxysilane, 3-methacryloxypropyl trimethoxysilane, or a similar silane compound; a siloxane compound that contains in one molecule at least one alkenyl group, or least one silicon-bonded hydrogen atom and silicon-bonded alkoxy group; or a mixture of a silane compound or a siloxane compound that contains at least one silicon-bonded alkoxy group with a siloxane compound that contains in one molecule at least one silicon-bonded hydroxy group and at least one alkenyl group; siloxane compounds represented by the following formula:

[First Chemical Formula]

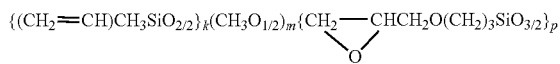

(wherein "k", "m", and "p" are positive numbers),
or siloxane compounds represented by the following formula:

[Second Chemical Formula]

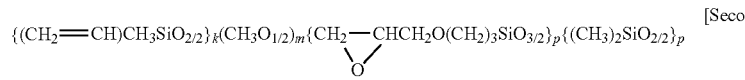

(wherein "k", "m", "p", and "q" are positive numbers).

It is recommended that the adhesive promoter be used in the form of a low-viscosity liquid. Although there are no special requirements with regard to viscosity of this component, it is recommended that at 25° C. viscosity be in the range of 1 to 500 mPa·s. Also, there are no special restrictions with regard to amounts in which the adhesion promoter can be added to the composition. It can be recommended, however, to add this component in the amount equal to or less than 15 parts by weight, e.g., in the range of 0.01 to 10 parts by weight, preferably 0.5 to 10 parts by weight per 100 parts by weight of the total weight of the composition.

Within the limits which are not in contradiction with the objects of the invention, the composition may contain other arbitrary components such as sensitizers, higher fatty acid metal salts, ester-type waxes, plasticizers, flexibility promoters, fillers, silane coupling agents, etc. The flexibility promoters may comprise silicone oils or silicone rubbers. The fillers can be exemplified by glass fibers, alumina fibers, alumina-silica ceramic fibers, boron fibers, zirconia fibers, silicon-carbide fibers, metal fibers, polyester fibers, aramide fibers, Nylon fibers, phenol fibers, animal-origin fibers, or other fibrous fibers; fused silica, precipitated silica, fumed silica, baked silica, zinc oxide, baked clay, carbon black, glass beads, alumina, talc, calcium carbonate, clay, aluminum hydroxide, barium sulfate, titanium dioxide, aluminum nitride, silicon carbide, magnesium oxide, beryllium oxide, kaolin, mica, zirconia, or other fillers, or two or more of the above substances in a mixture.

The following is a more detailed description of a cured product of the composition.

The composition of the invention can be cured at room temperature or with heating. Curing with heating is preferable since this accelerates the curing. The heating temperature should be in the range of 50 to 250° C. A cured product of the composition is obtained in the form of rubber, particular, hard rubber, or resin that possesses flexibility. Such a composition may find use as an adhesive agent, potting agent, protective-coating agent, underfill agent, etc., for electrical and electronic applications. In view of high optical transmittance of cured products obtained from the composition of the invention, the composition is especially suitable for use as an adhesive agent, potting agent, protective-coating agent, and an underfill agent for semiconductor elements of optical devices.

EXAMPLES

The organopolysiloxane of the invention, method of manufacturing thereof, the curable silicone composition, and a cured product of the composition will be further described in details with reference to practical and comparative examples. In these examples, viscosity values were measured at 25° C. The weight-average molecular weight was obtained by using THF as a solvent and presented in values recalculated with reference to polystyrene and measured with the use of gel-permeation chromatography (hereinafter referred to as "GPC").
[Storage Modulus of Elasticity and Glass-Transition Point $(T_g)$]

A specimen having 10 mm width, 40 mm length, and 2 mm thickness was produced by cutting out a piece from a cured body of the curable silicone composition by means of a cutter. The index of dynamic viscoelasticity inherent in the obtained specimen was measured with the use of a viscoelasticity analyzer ARES of Rheometric Scientific, Inc. (Model RDA700). The storage modulus of elasticity and tan δ were determined in the temperature range of 150° C. to 250° C. with a heating rate of 3° C. per minute at 1 Hz oscillation and 0.05% twist strain. The glass transition point $(T_g)$ of the cured product was determined from the value of tan δ.
[Cured Product Appearance and Transparency]

These characteristics were evaluated by visually inspecting the same specimen as the one required for measuring a composite modulus of elasticity.
[Surface-Tacking Properties on the Surface of Cured Product]

Surface-tacking properties were evaluated by sensation felt when touching with a finger the surface of the same specimen as the one required for measuring a composite modulus of elasticity.

Practical Example 1

A mixture was prepared by mixing 276.04 parts by weight of a 54.4 wt. % toluene solution of an organopolysiloxane (weight-average molecular weight=1,550; vinyl-group content=5.6 wt. %) which was solid at 25° C. and was represented by the following average unit formula:

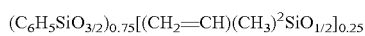

with 13.35 parts by weight of a dimethylpolysiloxane represented by the following formula:

(this component contained 0.04 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and stirred for 3 hours at a temperature of 103° C. to 107° C. Toluene was removed with heating at 138° C. under a reduced pressure of 28 mmHg and then the mixture was cooled to produce an organopolysiloxane, which was solid and transparent at 25° C. and was obtained with a yield of 99% (weight-average molecular weight=1,770; vinyl-group content=4.8 wt. %).

Practical Example 2

A mixture was prepared by mixing 275.70 parts by weight of a 54.4 wt. % toluene solution of an organopolysiloxane (weight-average molecular weight=1,550; vinyl-group content=5.6 wt. %) which was solid at 25° C. and was represented by the following average unit formula:

$(C_6H_5SiO_{3/2})_{0.75}[(CH_2=CH)(CH_3)_2SiO_{1/2}]_{0.25}$ with 12.89 parts by weight of a dimethylpolysiloxane represented by the following formula:

$H[(CH_3)_2SiO]_{25}Si(CH_3)_3$ (this component contained 0.02 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and stirred for 1 hour at a temperature of 108° C. to 109° C. Toluene was removed with heating at 130° C. under a reduced pressure of 37 mmHg and then the mixture was cooled to produce an organopolysiloxane, which at 25° C. was a slightly white solid substance that was obtained with a yield of 99% (weight-average molecular weight=1,710; vinyl-group content=4.8 wt. %).

Practical Example 3

A mixture was prepared by mixing 275.87 parts by weight of a 54.4 wt. % toluene solution of an organopolysiloxane (weight-average molecular weight=1,550; vinyl-group content=5.6 wt. %) which was solid at 25° C. and was represented by the following average unit formula:

$(C_6H_5SiO_{3/2})_{0.75}[(CH_2=CH)(CH_3)_2SiO_{1/2}]_{0.25}$ with 12.38 parts by weight of a dimethylpolysiloxane represented by the following formula:

$H[(CH_3)_2SiO]_{50}Si(CH_3)_3$ (this component contained 0.01 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and stirred for 40 min. at a temperature of 110° C. Toluene was removed with heating at 130° C. under a reduced pressure of 37 mmHg and then the mixture was cooled to produce an organopolysiloxane, which at 25° C. was a slightly white solid substance that was obtained with a yield of 99% (weight-average molecular weight=1,670; vinyl-group content=4.8 wt. %).

Practical Example 4

A mixture was prepared by mixing 275.70 parts by weight of a 54.4 wt. % toluene solution of an organopolysiloxane (weight-average molecular weight=1,550; vinyl-group content=5.6 wt. %) which was solid at 25° C. and was represented by the following average unit formula:

$(C_6H_5SiO_{3/2})_{0.75}[(CH_2=CH)(CH_3)_2SiO_{1/2}]_{0.25}$ with 26.40 parts by weight of a dimethylpolysiloxane represented by the following formula:

$H[(CH_3)_2SiO]_{12}Si(CH_3)_3$ (this component contained 0.08 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and stirred for 1 hour at a temperature of 90° C. to 113° C. Toluene was removed with heating at 138° C. under a reduced pressure of 28 mmHg and then the mixture was cooled to produce an organopolysiloxane, which at 25° C. comprised a mixture of oily and solid substances that was obtained with a yield of 99% (weight-average molecular weight=2,000; vinyl-group content=4.8 wt. %).

Practical Example 5

A mixture was prepared by mixing 148.21 parts by weight of a 54.4 wt. % toluene solution of an organopolysiloxane (weight-average molecular weight=1,550; vinyl-group content=5.6 wt. %) which was solid at 25° C. and was represented by the following average unit formula:

$(C_6H_5SiO_{3/2})_{0.75}[(CH_2=CH)(CH_3)_2SiO_{1/2}]_{0.25}$ with 35.21 parts by weight of an organopolysiloxane represented by the following formula:

$H[(CH_3)_2SiO]_{12}Si(CH_3)_3$ (this component contained 0.2 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and stirred for 1 hour at a temperature of 106° C. Toluene was removed with heating at 140° C. under a reduced pressure of 5 mmHg and then the mixture was cooled to produce an organopolysiloxane, which at 25° C. was a gum-like white viscous substance that was obtained with a yield of 99% {weight-average molecular weight=3,610 (specific surface ratio according to GPC=55.2%);

weight-average molecular weight=1,190 (specific surface ratio according to GPC=44.8%); vinyl-group content=4.8 wt. %}.

Practical Example 6

After 9.82 parts by weight of the organopolysiloxane prepared in Practical Example 5 were dissolved in toluene of the same weight, the solution was uniformly mixed with the following components: 64.83 parts by weight of an organopolysiloxane (weight-average molecular weight=1,550; vinyl-group content=5.6 wt. %), which was solid at 25° C. and represented by the following average unit formula:

$$(C_6H_5SiO_{3/2})_{0.75}[(CH_2=CH)(CH_3)_2SiO_{1/2}]_{0.25};$$

25.35 parts by weight of an organopolysiloxane having viscosity of 950 mPa·s and represented by the following average unit formula:

$$(C_6H_5SiO_{3/2})_{0.40}[(CH_3)_2HSiO_{1/2}]_{0.60};$$

(this component was used in such an amount that 1.1 moles of silicon-bonded hydrogen atoms of this component corresponded to 1 mole of vinyl groups contained in both aforementioned organopolysiloxanes); and a platinum-1,3-divinyl-1,1,3,3-tetramethyldisiloxane complex (contained in the composition in such an amount that, in terms of weight units, the content of metallic platinum in the complex was 5 ppm). As a result, a curable silicone composition was obtained. The obtained composition was cast in a mold and dried under atmospheric pressure with heating at 80° C. and it was subsequently cured for 1 hour at 150° C. Characteristics of the obtained cured product are shown in Table 1.

Practical Example 7

After 56.74 parts by weight of the organopolysiloxane prepared in Practical Example 5 were dissolved in toluene of the same weight, the solution was uniformly mixed with the following components: 23.65 parts by weight of an organopolysiloxane (weight-average molecular weight=1,550; vinyl-group content=5.6 wt. %), which was solid at 25° C. and represented by the following average unit formula:

$$(C_6H_5SiO_{3/2})_{0.75}[(CH_2=CH)(CH_3)_2SiO_{1/2}]_{0.25};$$

19.61 parts by weight of an organopolysiloxane having viscosity of 950 mPa·s and represented by the following average unit formula:

$$(C_6H_5SiO_{3/2})0.40[(CH_3)_2HSiO_{1/2}]_{0.60};$$

(this component was used in such an amount that 1.1 moles of silicon-bonded hydrogen atoms of this component corresponded to 1 mole of vinyl groups contained in both aforementioned organopolysiloxanes); and a platinum-1,3-divinyl-1,1,3,3-tetramethyldisiloxane complex (contained in the composition in such an amount that, in terms of weight units, the content of metallic platinum in the complex was 5 ppm). As a result, a curable silicone composition was obtained. The obtained composition was cast in a mold and dried under atmospheric pressure with heating at 80° C. and it was subsequently cured for 1 hour at 150° C. Characteristics of the obtained cured product are shown in Table 1.

Practical Example 8

After 67.63 parts by weight of the organopolysiloxane prepared in Practical Example 5 were dissolved in toluene of the same weight, the solution was uniformly mixed with the following components: 14.10 parts by weight of an organopolysiloxane, which was solid at 25° C. and represented by the following average unit formula:

$$(C_6H_5SiO_{3/2})_{0.75}[(CH_2=CH)(CH_3)_2SiO_{1/2}]_{0.25};$$

18.27 parts by weight of an organopolysiloxane having viscosity of 950 mPa·s and represented by the following average unit formula:

$$(C_6H_5SiO_{3/2})_{0.40}[(CH_3)_2HSiO_{1/2}]_{0.60};$$

(this component was used in such an amount that 1.1 moles of silicon-bonded hydrogen atoms of this component corresponded to 1 mole of vinyl groups contained in both aforementioned organopolysiloxanes); and a platinum-1,3-divinyl-1,1,3,3-tetramethyldisiloxane complex (contained in the composition in such an amount that, in terms of weight units, the content of metallic platinum in the complex was 5 ppm). As a result, a curable silicone composition was obtained. The obtained composition was cast in a mold and dried under atmospheric pressure with heating at 80° C. and it was subsequently cured for 1 hour at 150° C. Characteristics of the obtained cured product are shown in Table 1.

Practical Example 9

After 83.69 parts by weight of the organopolysiloxane prepared in Practical Example 5 were dissolved in toluene of the same weight, the solution was uniformly mixed with the following components: 16.31 parts by weight of a partially branched organopolysiloxane having at 25° C. a viscosity of 950 mPa·s and represented by the following average unit formula:

$$(C_6H_5SiO_{3/2})_{0.40}[(CH_3)_2HSiO_{1/2}]_{0.60}$$

(this component was used in such an amount that 1.1 moles of silicon-bonded hydrogen atoms of this component corresponded to 1 mole of vinyl groups contained in the aforementioned organopolysiloxane); and a platinum-1,3-divinyl-1,1,3,3-tetramethyldisiloxane complex (contained in the composition in such an amount that, in terms of weight units, the content of metallic platinum in the complex was 5 ppm). As a result, a curable silicone composition was obtained. The obtained composition was cast in a mold and dried under atmospheric pressure with heating at 80° C. and it was subsequently cured for 1 hour at 150° C. Characteristics of the obtained cured product are shown in Table 1.

Comparative Example 1

A mixture was prepared by mixing 73.5 parts by weight of an organopolysiloxane (weight-average molecular weight=1, 600; vinyl-group content=5.6 wt. %) which was solid at 25° C. and was represented by the following average unit formula:

$$(C_6H_5SiO_{3/2})_{0.75}[(CH_2=CH)(CH_3)_2SiO_{1/2}]_{0.25}$$

with 26.5 parts by weight of an organopolysiloxane, which had a viscosity of 950 mPa·s and was represented by the following average unit formula:

$$(C_6H_5SiO_{3/2})_{0.40}[(CH_3)_2SiO_{1/2}]_{0.60}$$

(this component contained 1.1 moles of silicon-bonded hydrogen atoms per 1 mole of vinyl groups contained in the aforementioned organopolysiloxane), and with a platinum-1, 3-divinyl-1,1,3,3-tetramethyldisiloxane complex (contained in the composition in such an amount that, in terms of weight units, the content of metallic platinum in the complex was 2 ppm). As a result, a curable silicone composition was obtained. The obtained composition was cast in a mold and cured for 1 hour at 150° C. Characteristics of the obtained cured product are shown in Table 1.

TABLE 1

| Properties | | Examples | | | | Comparative Examples |
|---|---|---|---|---|---|---|
| | | Present Invention | | | | |
| | | Pr. Ex. 6 | Pr. Ex. 7 | Pr. Ex. 8 | Pr. Ex. 9 | Comp. Ex. 1 |
| Storage Modulus of Elasticity (MPa) | 25° C. | 210 | 85 | 71 | 100 | 468 |
| | 100° C. | 88 | 22 | 13 | 21 | 111 |
| | 200° C. | 82 | 15 | 9 | 18 | 130 |
| $T_g$ (° C.) | | 54 | 54 | 54 | 58 | 59 |
| Appearance | | Light turbidity | Transparent | Light turbidity | Transparent | transparent |
| Surface Tackiness | | | | None | | |

Industrial Applicability

The curable silicone composition of the invention is capable of forming a cured product, which is resistant to cracking caused by deformations generated under the effect of thermal-shock-induced stress, and which possesses excellent durability, flexibility, and has the same hardness as hard plastics. In preferred embodiments, the cured product of the composition demonstrates the property of high optical transmittance. The composition is suitable for use as a coating material, or as sealing agent for optical devices such as LEDs, etc. The composition may also be used as a material for manufacturing optical lenses, as a hard-coating agent, etc. Since the composition itself possesses adhesive properties, it may be used as a strong and a heat-resistant adhesive agent.

The invention claimed is:

1. An organopolysiloxane represented by the following average structural formula:

$$R^1_a SiO_{(4-a)/2}$$

{wherein $R^1$ designates a substituted or unsubstituted monovalent hydrocarbon group, an alkoxy group, a hydroxyl group, or an organopolysiloxane residue of the following general formula:

$$-X-(SiR^2_2O)_m SiR^2_3$$

(wherein $R^2$ are the same or different, substituted or unsubstituted monovalent hydrocarbon groups; X represents a bivalent hydrocarbon group; and "m" is an integer equal to or greater than 1); however, at least one $R^1$ in one molecule is the aforementioned organopolysiloxane residue, at least one $R^1$ in one molecule is a monovalent hydrocarbon group having an aliphatic carbon-carbon double bond, and "a" is a positive number that satisfies the following condition: 0<a<2)}.

2. The organopolysiloxane of claim 1, wherein in one molecule at least one $R^1$ is an aryl group.

3. The organopolysiloxane of claim 1, wherein in one molecule at least one $R^2$ is a methyl group.

4. The organopolysiloxane of claim 1, which at 25° C. is a solid substance or a liquid substance having a viscosity equal to or greater than 10 mPa·s.

5. A method of manufacturing the organopolysiloxane of claim 1, comprising the step of reacting:

(i) an organopolysiloxane represented by the following average structural formula:

$$R^3_a SiO_{(4-a)/2}$$

(wherein $R^3$ represents a substituted or unsubstituted monovalent hydrocarbon group, an alkoxy group, or a hydroxyl group, in one molecule at least one $R^3$ is monovalent hydrocarbon group having aliphatic carbon-carbon double bond; and "a" is a positive number that satisfies the following condition: 0<a<2), and (ii) a diorganopolysiloxane represented by the following general formula:

$$H(SiR^4_2 O)_m SiR^4_3$$

(wherein $R^4$ designates substituted or unsubstituted monovalent hydrocarbon groups that can be identical or different and that are free of unsaturated aliphatic bonds, and "m" is an integer equal to or greater than 1) {constituent (ii) is used in such an amount that the content of silicon-bonded hydrogen atoms of this constituent is less than 1 mole per 1 mole of the monovalent hydrocarbon groups having aliphatic carbon-carbon double bonds of constituent (i)}, the reaction being carried out in the presence of (iii) a hydrosilylation catalyst.

6. A curable silicone composition comprising:

(A) an organopolysiloxane represented by the following average structural formula:

$$R^1_a SiO_{(4-a)/2}$$

{wherein $R^1$ designates a substituted or non-substituted monovalent hydrocarbon group, an alkoxy group, a hydroxyl group, or an organopolysiloxane residue of the following general formula:

$$-X-(SiR^2_2O)_m SiR^2_3$$

(wherein $R^2$ are the same or different, substituted or unsubstituted monovalent hydrocarbon groups; X represents a bivalent hydrocarbon group; and "m" is an integer equal to or greater than 1); however, at least one $R^1$ in one molecule is the aforementioned organopolysiloxane residue, at least one $R^1$ is a monovalent hydrocarbon group having aliphatic carbon-carbon double bonds, and "a" is a positive number that satisfies the following condition: 0<a<2)};

(B) an organic silicon compound having in one molecule at least two silicon-bonded hydrogen atoms {this component is used in such an amount that the content of silicon-bonded hydrogen atoms of this component ranges from 0.1 to 10 moles per 1 mole of the monovalent hydrocarbon groups having aliphatic carbon-carbon double bonds of the aforementioned component (A)}; and (C) a catalytic amount of a hydrosilylation catalyst.

7. The curable silicone composition of claim 6, wherein component (A) is an organopolysiloxane having in one molecule at least one $R^1$ as an aryl group.

8. The curable silicone composition of claim 6, wherein component (A) is an organopolysiloxane having in one molecule at least one $R^2$ as a methyl group.

9. The curable silicone composition of claim 6, wherein at 25° C. component (A) is a solid substance or a liquid having viscosity equal to or greater than 10 mPa·s.

10. A method of forming a cured product comprising curing the curable silicone composition according to claim 6.

11. A method of manufacturing an organopolysiloxane represented by the following average structural formula:

$$R^1{}_a SiO_{(4-a)/2}$$

{wherein $R^1$ designates a substituted or unsubstituted monovalent hydrocarbon group, an alkoxy group, a hydroxyl group, or an organopolysiloxane residue of the following general formula:

$$-X-(SiR^2{}_2O)_m SiR^2{}_3$$

(wherein $R^2$ are the same or different, substituted or unsubstituted monovalent hydrocarbon groups; X represents oxygen atoms or a bivalent hydrocarbon group; and "m" is an integer equal to or greater than 1); however, at least one $R^1$ in one molecule is the aforementioned organopolysiloxane residue, and "a" is a positive number that satisfies the following condition: 0<a<2)}, said method comprising the step of reacting:

(i) an organopolysiloxane represented by the following average structural formula:

$$R^3{}_a SiO_{(4-a)/2}$$

(wherein $R^3$ represents a substituted or unsubstituted monovalent hydrocarbon group, an alkoxy group, or a hydroxyl group, in one molecule at least one $R^3$ is monovalent hydrocarbon group having aliphatic carbon-carbon double bond; and "a" is a positive number that satisfies the following condition: 0<a<2), and (ii) a diorganopolysiloxane represented by the following general formula:

$$H(SiR^4{}_2O)_m SiR^4{}_3$$

(wherein $R^4$ designates substituted or unsubstituted monovalent hydrocarbon groups that can be identical or different and that are free of unsaturated aliphatic bonds, and "m" is an integer equal to or greater than 1) {constituent (ii) is used in such an amount that the content of silicon-bonded hydrogen atoms of this constituent is less than 1 mole per 1 mole of the monovalent hydrocarbon groups having aliphatic carbon-carbon double bonds of constituent (i) }, the reaction being carried out in the presence of (iii) a hydrosilylation catalyst.

12. The method of claim 11, wherein in one molecule at least one $R^1$ is a monovalent hydrocarbon group having an aliphatic carbon-carbon double bond.

13. The method of claim 11, wherein in one molecule at least one $R^1$ is an aryl group.

14. The method of claim 11, wherein in one molecule at least one $R^2$ is a methyl group.

15. The method of claim 11, wherein the organopolysiloxane at 25° C. is a solid substance or a liquid substance having a viscosity equal to or greater than 10 mPa·s.

\* \* \* \* \*